United States Patent
Slimacek

(10) Patent No.: US 11,747,035 B2
(45) Date of Patent: Sep. 5, 2023

(54) PIPELINE FOR CONTINUOUS IMPROVEMENT OF AN HVAC HEALTH MONITORING SYSTEM COMBINING RULES AND ANOMALY DETECTION

(71) Applicant: Honeywell International Inc., Charlotte, NC (US)

(72) Inventor: Vaclav Slimacek, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 395 days.

(21) Appl. No.: 16/834,806

(22) Filed: Mar. 30, 2020

(65) Prior Publication Data

US 2021/0302042 A1    Sep. 30, 2021

(51) Int. Cl.
*F24F 11/38*    (2018.01)
*F24F 11/64*    (2018.01)

(52) U.S. Cl.
CPC ............... *F24F 11/38* (2018.01); *F24F 11/64* (2018.01)

(58) Field of Classification Search
CPC ... F24F 11/38; F24F 11/64; G05B 2219/2614; G05B 23/024
See application file for complete search history.

(56) References Cited

U.S. PATENT DOCUMENTS

| | | |
|---|---|---|
| 2010/0057649 A1 | 3/2010 | Lee et al. |
| 2018/0114123 A1* | 4/2018 | Kim .................. G16H 50/70 |
| 2018/0278486 A1* | 9/2018 | Mermoud ............... H04L 41/16 |
| 2019/0238396 A1 | 8/2019 | Tedaldi et al. |
| 2019/0353277 A1* | 11/2019 | Sundareswara ..... F16K 37/0025 |
| 2019/0391573 A1 | 12/2019 | Wang |
| 2020/0184253 A1* | 6/2020 | Butscher ................ G06N 20/00 |
| 2021/0090736 A1* | 3/2021 | Innanje .................. G16H 40/63 |

OTHER PUBLICATIONS

Lui et al., Isolation Forest, 2008, [online article] [retrieved on Jun. 9, 2020] retrieved from the Internet URL: https://www.researchgate.net/publication/224384174_Isolation_Forest, 10 pages.
International Search Report dated Jun. 23, 2021 for WO Application No. PCT/US21/023076.
Written Opinion of the ISA dated Jun. 23, 2021 for WO Application No. PCT/US21/023076.

* cited by examiner

*Primary Examiner* — Thomas C Lee
*Assistant Examiner* — Charles Cai
(74) *Attorney, Agent, or Firm* — Alston & Bird LLP

(57) ABSTRACT

A method, apparatus, and computer program product provide for improving performance of a condition monitoring system by combining rules and anomaly detection. In the context of a method, the method receives plurality of telemetry data from a monitored system. The method processes the plurality of telemetry data to generate an anomaly score set. The method also processes the plurality of telemetry data in accordance with the predefined rule data object set to generate a rule-based result set. The method determines whether the plurality of telemetry data is associated with an undetected fault of the monitored system and generates an extracted rule data object based on the telemetry data. The method also monitors performance of the machine learning anomaly detection model and determines whether retraining is necessary.

20 Claims, 7 Drawing Sheets

US 11,747,035 B2

PIPELINE FOR CONTINUOUS IMPROVEMENT OF AN HVAC HEALTH MONITORING SYSTEM COMBINING RULES AND ANOMALY DETECTION

TECHNOLOGICAL FIELD

An example embodiment relates generally to condition monitoring systems, and, more particularly, to techniques for improving performance of a condition monitoring system by combining rules and anomaly detection.

BRIEF SUMMARY

A method, apparatus, and computer program product are disclosed for improving performance of a condition monitoring system by combining rules and anomaly detection.

In an example embodiment, an apparatus configured to detect anomalies is provided, the apparatus comprising at least one processor and at least one non-transitory memory including program code, the at least one non-transitory memory and the program code configured to, with the processor, cause the apparatus to at least receive a plurality of telemetry data from a monitored system, the telemetry data comprising data captured by one or more sensor devices associated with the monitored system. The memory including the program code is further configured to, with the processor, cause the apparatus to process the plurality of telemetry data to generate an anomaly score set for the plurality of telemetry data. In some embodiments, processing the plurality of telemetry data to generate an anomaly score set comprises processing the plurality of telemetry data in accordance with a machine learning anomaly detection model. The memory including the program code is further configured to, with the processor, cause the apparatus to process the plurality of telemetry data in accordance with a predefined rule data object set to generate a rule-based result set. The memory including the program code is further configured to, with the processor, cause the apparatus to determine, based on an analysis of the anomaly score set and the rule-based result set, whether the plurality of telemetry data is associated with an undetected fault of the monitored system, and in accordance with a determination that the telemetry data is associated with an undetected fault of the monitored system, the memory including the program code is further configured to, with the processor, cause the apparatus to generate at least one extracted rule data object associated with the fault and cause transmission of data indicative of the fault of the monitored system and an indication of the at least one extracted rule data object to an administrative device associated with the monitored system for display and evaluation.

In some embodiments of the apparatus, the memory including the program code is further configured to, with the processor, cause the apparatus to receive at least one modified rule data object, wherein the at least one modified rule data object is at least partially based on the at least one extracted rule data object and store the modified rule data object in association with the predefined rule data object set. In some embodiments of the apparatus, the memory including the program code is further configured to, with the processor, cause the apparatus to generate a performance evaluation score set for the machine learning anomaly detection model based on a comparison of the anomaly score set and the rule-based result set, determine, based on the performance evaluation score set, whether the machine learning anomaly detection model requires retraining, and output an indication of the determination and performance evaluation score set for evaluation. In some embodiments of the apparatus, the monitored system comprises a heating, ventilation, and air-conditioning (HVAC) system. In some embodiments of the apparatus, the machine learning anomaly detection model comprises an isolation forest machine learning model. In some embodiments of the apparatus, the memory including the program code is further configured to, with the processor, cause the apparatus to determine an assigned value for the anomaly score set based on a comparison of an anomaly score associated with the anomaly score set and a predefined limit value. In some embodiments of the apparatus, the analysis of the anomaly score set and the rule-based result set comprises a comparison of the assigned value and the rule-based result set.

In another example embodiment, a computer-implemented method for detecting anomalies is provided, comprising receiving a plurality of telemetry data from a monitored system, wherein the telemetry data comprises data captured by one or more sensor devices associated with the monitored system. The computer-implemented method further comprises processing the plurality of telemetry data to generate an anomaly score set for the plurality of telemetry data. In some embodiments, processing the plurality of telemetry data to generate an anomaly score set comprises processing the plurality of telemetry data in accordance with a machine learning anomaly detection model. The computer-implemented method further comprises processing the plurality of telemetry data in accordance with a predefined rule data object set to generate a rule-based result set. The computer-implemented method further comprises determining, based on an analysis of the anomaly score set and the rule-based result set, whether the plurality of telemetry data is associated with an undetected fault of the monitored system, and in accordance with a determination that the telemetry data is associated with an undetected fault of the monitored system, the computer-implemented method further comprises generating at least one extracted rule data object associated with the fault and causing transmission of data indicative of the fault of the monitored system and an indication of the at least one extracted rule data object to an administrative device associated with the monitored system for display and evaluation.

In some embodiments, the computer-implemented method further comprises receiving at least one modified rule data object at least partially based on the at least one extracted rule data object and storing the modified rule data object in association with the predefined rule data object set. In some embodiments, the computer-implemented method further comprises generating a performance evaluation score set for the machine learning anomaly detection model based on a comparison of the anomaly score set and the rule-based result set, determining, based on the performance evaluation score set, whether the machine learning anomaly detection model requires retraining, and outputting an indication of the determination and performance evaluation score set for evaluation. In some embodiments of the computer-implemented method, the monitored system comprises a heating, ventilation, and air-conditioning (HVAC) system. In some embodiments of the computer-implemented method, the machine learning anomaly detection model comprises an isolation forest machine learning model. In some embodiments, the computer-implemented method further comprises determining an assigned value for the anomaly score set based on a comparison of an anomaly score associated with the anomaly score set and a predefined limit value. In some embodiments, the computer-implemented method further comprises the analysis of the anomaly score set and the rule-based result set comprises a comparison of the assigned value and the rule-based result set.

In another example embodiment, a computer program product is provided comprising at least one non-transitory computer-readable storage medium having computer-readable program code portions stored therein, the computer-readable program code portions comprising an executable portion configured to receive a plurality of telemetry data from a monitored system, wherein the telemetry data comprises data captured by one or more sensor devices associated with the monitored system. The computer-readable program code portions comprising the executable portion are further configured to process the plurality of telemetry data to generate an anomaly score set for the plurality of telemetry data. In some embodiments, processing the plurality of telemetry data to generate an anomaly score set comprises processing the plurality of telemetry data in accordance with a machine learning anomaly detection model. The computer-readable program code portions comprising the executable portion are further configured to process the plurality of telemetry data in accordance with a predefined rule data object set to generate a rule-based result set. The computer-readable program code portions comprising the executable portion are further configured to determine, based on an analysis of the anomaly score set and the rule-based result set, whether the plurality of telemetry data is associated with an undetected fault of the monitored system, and in accordance with a determination that the telemetry data is associated with an undetected fault of the monitored system, the computer-readable program code portions comprising the executable portion are further configured to generate at least one extracted rule data object associated with the fault and cause transmission of an indication of data indicative of the fault of the monitored system and the at least one extracted rule data object to an administrative device associated with the monitored system for display and evaluation.

In some embodiments of the computer program product, the computer-readable program code portions comprising the executable portion are further configured to receive at least one modified rule data object at least partially based on the at least one extracted rule data object and store the modified rule data object in association with the predefined rule data object set. In some embodiments of the computer program product, the computer-readable program code portions comprising the executable portion are further configured to generate a performance evaluation score set for the machine learning anomaly detection model based on a comparison of the anomaly score set and the rule-based result set, determine, based on the performance evaluation score set, whether the machine learning anomaly detection model requires retraining, and output an indication of the determination and performance evaluation score set for evaluation.

In some embodiments of the computer program product, the monitored system comprises a heating, ventilation, and air-conditioning (HVAC) system. In some embodiments of the computer program product, the machine learning anomaly detection model comprises an isolation forest machine learning model. In some embodiments of the computer program product, the computer-readable program code portions comprising the executable portion are further configured to determine an assigned value for the anomaly score set based on a comparison of an anomaly score associated with the anomaly score set and a predefined limit value, such that the analysis of the anomaly score set and the rule-based result set comprises a comparison of the assigned value and the rule-based result set.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
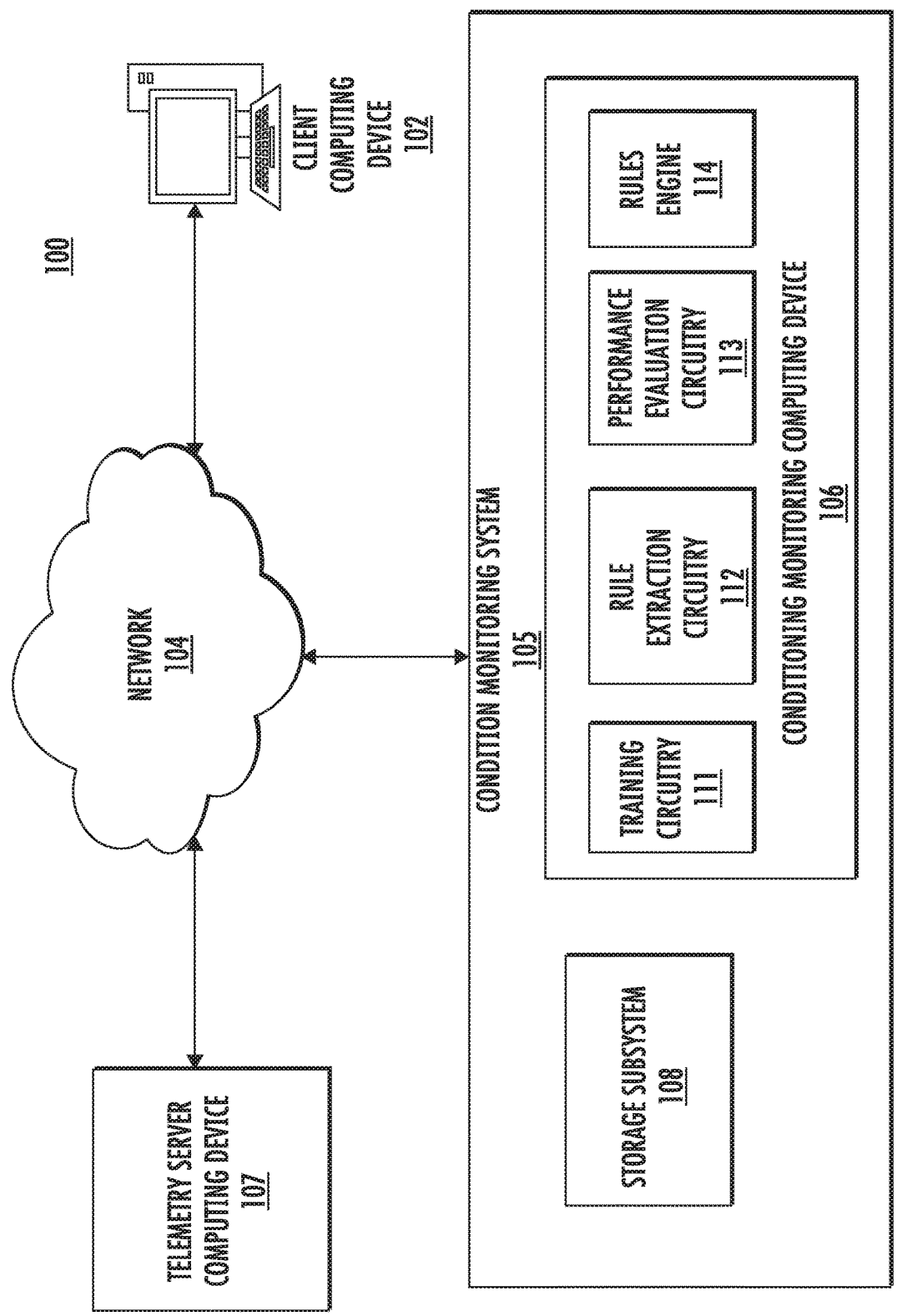

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

Figure 2:
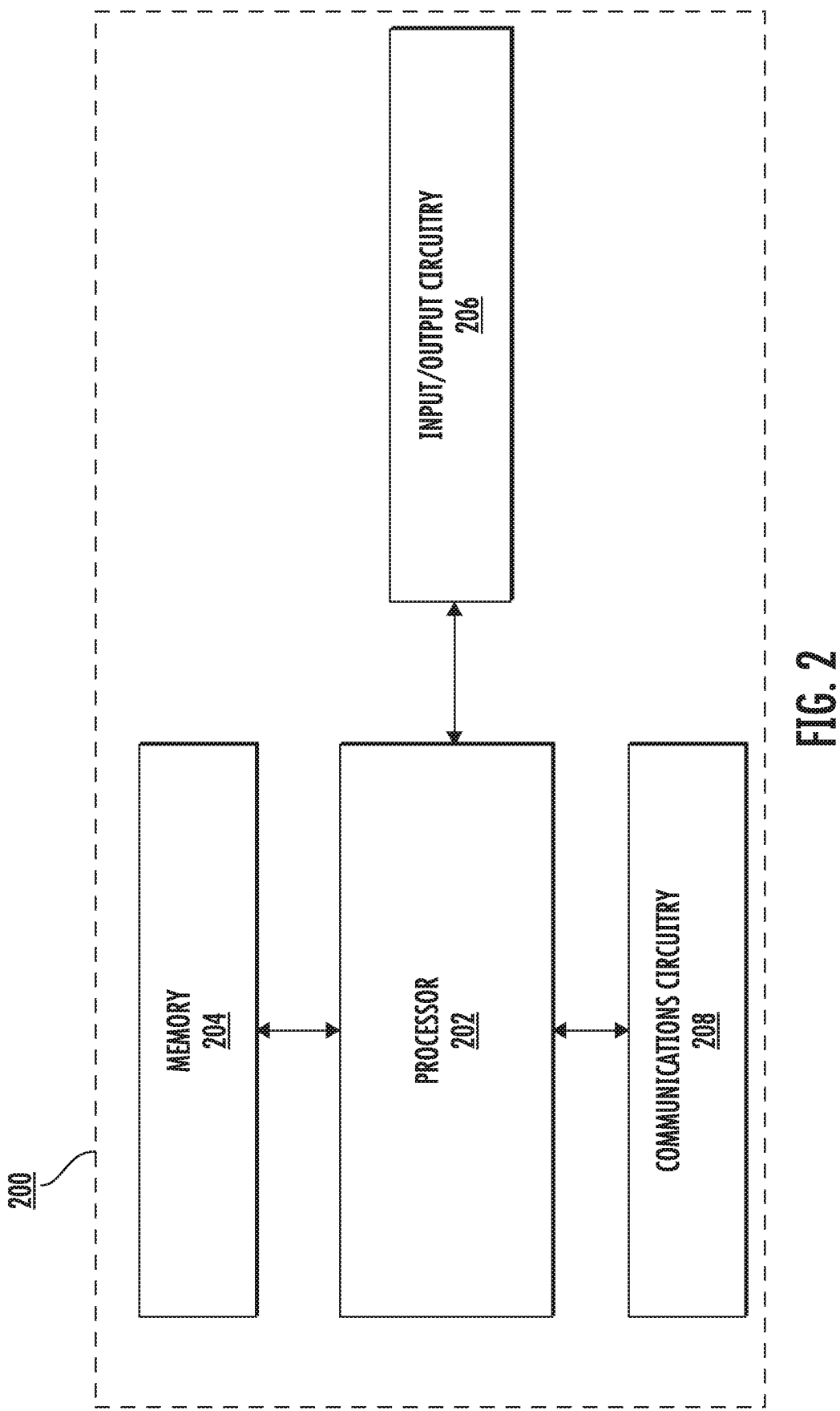
Figure 3:
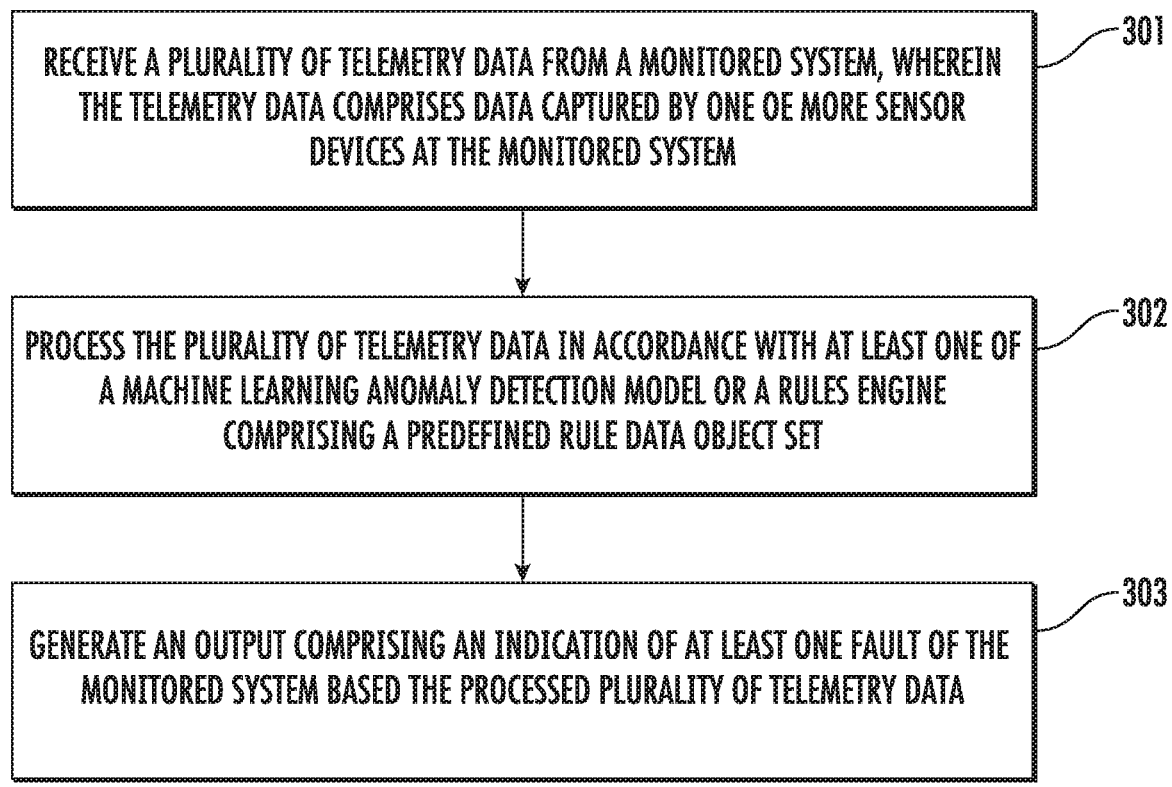
Figure 4:
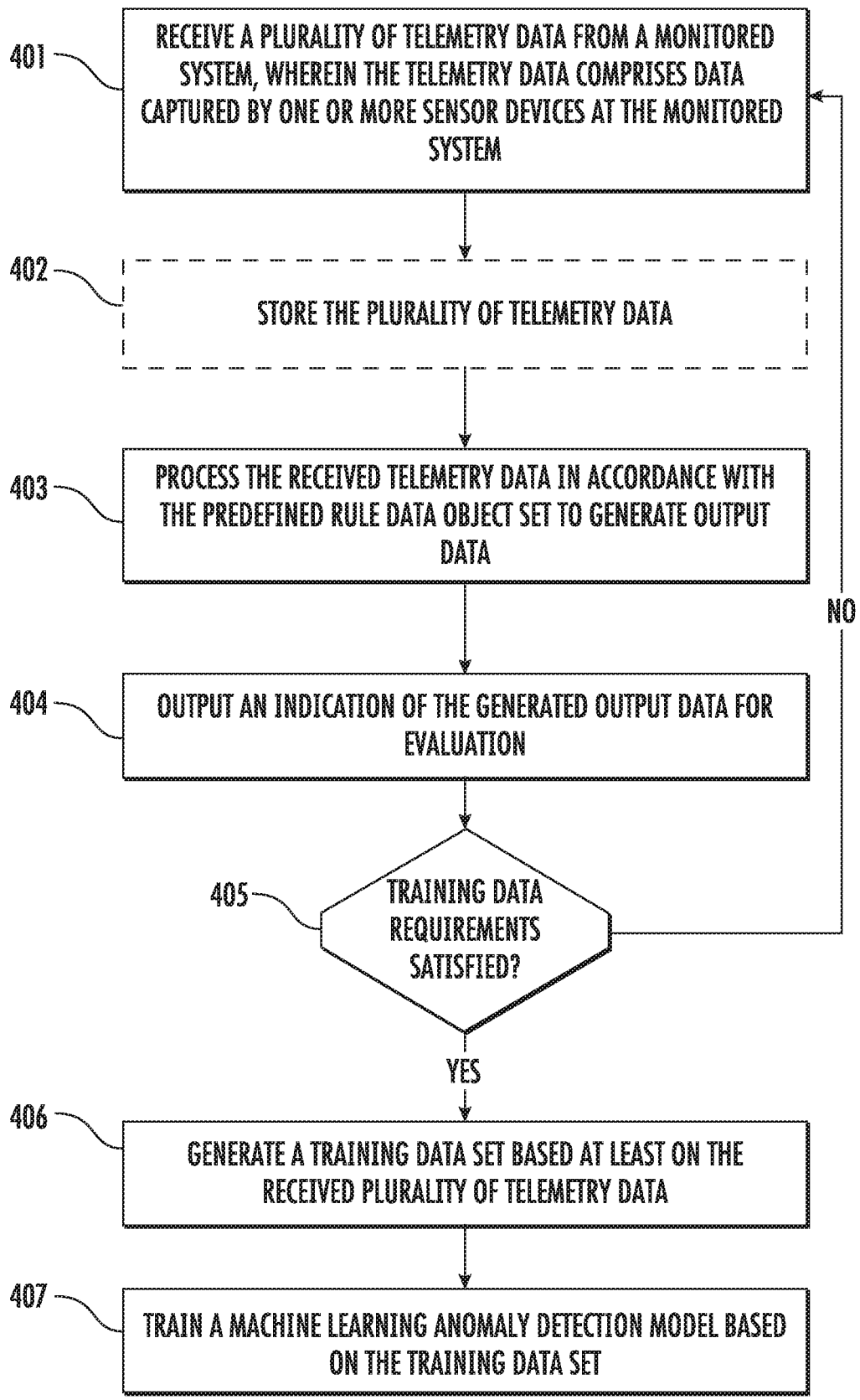
Figure 5A:
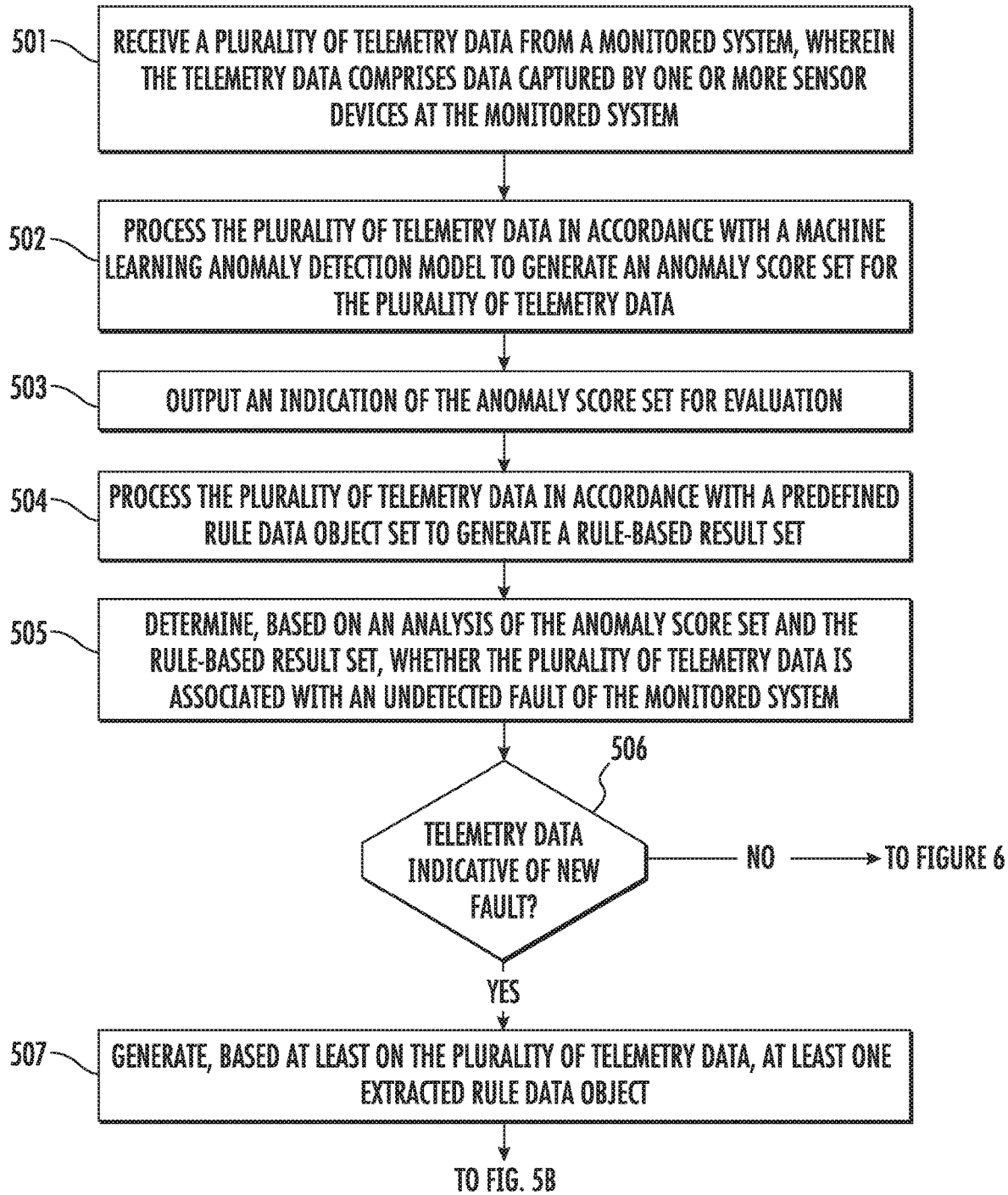
Figure 5B:
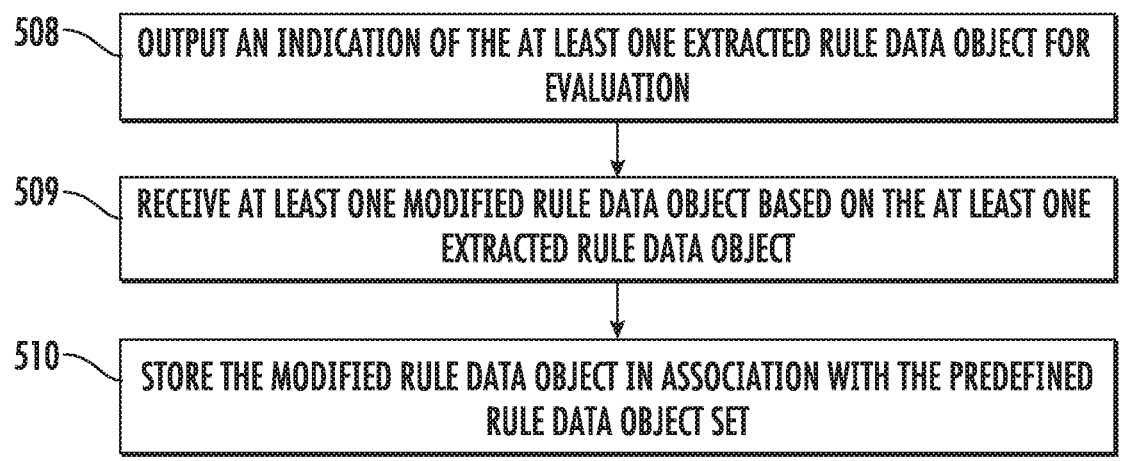
Figure 6:
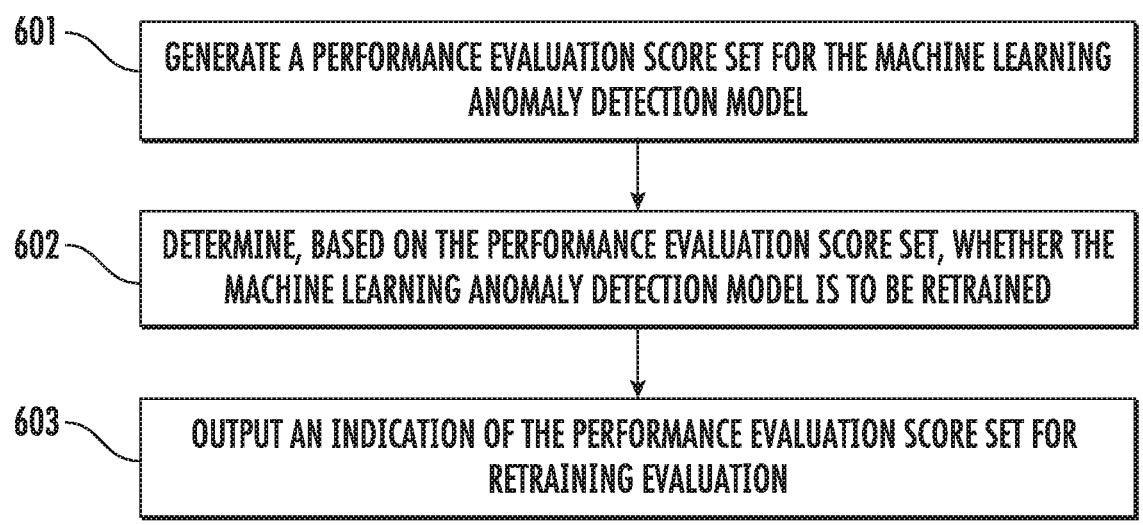

FIG. 1 is a block diagram of a system configured to communicate via a network in accordance with an example embodiment;

FIG. 2 is a block diagram of an apparatus that may be specifically configured in accordance with an example embodiment of the present disclosure;

FIG. 3 is a flowchart illustrating operations performed in accordance with an example embodiment;

FIG. 4 is a flowchart illustrating operations performed during a cold start period in accordance with an example embodiment;

FIG. 5A is a flowchart illustrating example rule extraction operations performed in accordance with an example embodiment;

FIG. 5B is a flowchart illustrating example modified rule data object storage operations performed in accordance with an example embodiment; and FIG. 6 is a flowchart illustrating example performance evaluation operations performed in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The phrases "in one embodiment," "according to one embodiment," "in some embodiments," and the like generally refer to the fact that the particular feature, structure, or characteristic following the phrase may be included in the at least one embodiment of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

As used herein, the term "monitored system" may refer to computer hardware that is configured (either physically or by the execution of software) to collect and/or generate telemetry data of the present disclosure and, among various other functions, is configured to directly, or indirectly, transmit and receive data. An example monitored system may refer to a computing device/system of an HVAC system that may be, in whole or in part, supported by the HVAC system during operation and configured to facilitate operation thereof. Said differently, the monitored system may refer to the collection of sensors (e.g., sensor devices), processors, memories, gauges, displays, and the like configured to control or facilitate operation of one or more processes of a system, such as an HVAC system. Furthermore, the monitored system may be housed, in some embodiments, entirely by the HVAC system, while in other embodiments, the monitored system may include some or all elements located separate from the HVAC system. An example monitored system may refer to a computing device/system configured for collecting and/or generating telemetry data for an HVAC system. In some embodiments, the monitored system may be configured to communicate with the other computing devices via Bluetooth, NFC, Wi-Fi, 3G, 4G, 5G, RFID protocols, and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Overview

In some examples, it may be beneficial to monitor a system, such as an HVAC system, in order to detect warning signs of problems in advance to prevent unscheduled outages, optimize performance, and/or reduce repairs and maintenance costs. In some examples, health and performance of HVAC systems can be monitored by a condition monitoring system. In this regard, condition monitoring refers the process of monitoring a parameter of conditions in machinery, in order to identify a significant change which may be indicative of a developing fault.

In some examples, conditioning monitoring systems may be rule-based systems, that is, an example rule-based condition monitoring system monitors and evaluates one or more monitored systems based on a base set of predefined rules (e.g., rule data objects) in a rules engine. One example benefit of a rule-based condition monitoring system is that rules can be easily understandable and interpretable, allowing a system engineer and/or the like to easily recognize a developing fault or other issue via triggering of a rule. As another example benefit, rules may be used without collection of data, since rules can be based on domain knowledge.

For example, a rule that may be associated with an HVAC system may be a rule associated with maintaining a comfort level in a room, which compares a set point (e.g., a temperature at which the HVAC system is presently configured to) to an actual temperature of the room recorded by one or more sensor devices. If the difference between the set point and the actual temperature is greater than a predefined threshold according to the rule, the rule may be triggered such that the rule returns output data indicative of a fault in the HVAC system.

However, rule-based systems may exhibit a plurality of disadvantages. For example, rules only detect faults that have been experienced before and/or anticipated in advance. In this regard, if a fault has not been previously observed, a rule related to the unobserved fault may not be defined and thus, the fault may remain undetected. In this regard, evaluation of performance of rule-based systems may be skewed, in some examples. Additionally, rules are based on predefined and/or otherwise fixed limits and are unable to quantify importance or criticality of a detected fault. For example, a rule could be triggered whether particular telemetry data processed by the rule exceeds a threshold associated with the rule by 0.1 or exceeds the threshold by 10.0. Further, due to the predefined limits imposed by rules, it is difficult to transfer rules to or otherwise rely on previously generated rules in a new system, as well as define rules based on faults that are more complex than simply imposing predefined or otherwise fixed limits.

In some examples, the disadvantages of rule-based systems can be alleviated by machine learning methods for anomaly (e.g., fault) detection, such as, for example, an unsupervised machine learning algorithm. In some examples, an unsupervised machine learning algorithm may take the form of an isolation forest algorithm. In some examples, isolation forest models can identify anomalies in data in contrast to, for example, profiling normal data points as in other outlier detection methods.

In some examples, an isolation forest model, like similar tree ensemble methods, is built on the basis of decision trees. For example, since anomalies may be both few and different, they can be easier to isolate compared to normal points. An embodiment of the isolation forest algorithm, when applied for anomaly detection, builds an ensemble of isolation trees (iTrees) for a data set, and anomalies, in some examples, are data points that have shorter average path lengths on the iTrees. In this regard, anomaly detection methods that rely on unsupervised machine learning algorithms can improve upon rule-based systems in a number of ways, such as by detecting faults that have been previously undetected or unobserved, and thus not already be defined by one or more rules, and/or the like.

However, machine learning anomaly detection models, such as isolation forest, may, in some examples, suffer disadvantages in the form of a cold-start problem. For example, a newly operational monitored system lacks a history of data to properly train a machine learning anomaly detection model and/or otherwise base any detection of anomalies on. With a lack of historical data to train the machine learning anomaly detection model, the model may initially function in an undesired manner. In this regard, due to a lack of initial insights and validation metrics, building and training the model towards an optimal solution may result in inaccuracies and unusual results. In other words, without an initial amount of data (e.g., a training data set), anomaly detection processes may be inaccurate, at least during an initial cold-start period in which the monitored system is operating. In this regard, it may be difficult to evaluate anomaly detection models in some examples.

Example embodiments herein generate a training data set based on processing telemetry data received from a monitored system and train a machine learning anomaly detection model based on the generated training data set such that conventional problems incurred by machine learning anomaly detection algorithms are alleviated and allow for the machine learning anomaly detection model to more readily analyze incoming telemetry data and recognize previously undetected anomalies and/or faults.

Additionally, example embodiments herein process telemetry data in accordance with the machine learning anomaly detection model to generate an anomaly score set for the telemetry data and, based at least on an analysis of the anomaly score set, generate an extracted rule data object. In this regard, new rules for faults previously unobserved and unassociated with any predefined rules are determined and extracted based on telemetry data processed by the machine learning anomaly detection model.

Further, example embodiments herein process a plurality of telemetry data in accordance with the predefined rule data object set to generate a rule-based result set, and, based on a comparison of the rule-based result set and the anomaly score set, generate a performance evaluation score set for the machine learning anomaly detection model. In this regard, the performance of the machine learning anomaly detection model can continuously be evaluated with respect to the predefined rule data object set in order to detect any abnormality and/or drift in performance of the machine learning anomaly detection model such that the machine learning anomaly detection model may be retrained if necessary.

In some examples, the machine learning anomaly detection model and/or the rule-based result set are operable to, in some examples, more accurately detect faults in a monitored system and, in further examples, take action to fix such faults. In some examples, the machine learning anomaly detection model, once trained based on the generated training data set, can continuously learn as the machine learning anomaly detection model continuously receives and processes new and/or otherwise updated telemetry data. In this regard, the machine learning anomaly detection model detects faults of the monitored system in the form of detected anomalies, and new rules for faults previously undetected and/or unobserved are determined, extracted, and added to a rule set.

Example System Architecture and Example Apparatus

Referring now to FIG. 1, an example system 100 within which embodiments disclosed herein may operate is illustrated. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of such a system, numerous other configurations may also be employed. In some embodiments the system 100 includes a condition monitoring system 105 configured to interact with one or more client computing devices 102. In some embodiments, the condition monitoring system 105 is configured to cause transmission of data, such as one or more indications of one or more extracted rule data objects, to the client computing devices 102.

The telemetry data may be associated with one or more monitored systems, such as one or more heating, ventilation, and air-conditioning (HVAC) systems. In some embodiments, telemetry data refers to data obtained by recording readings of one or more sensor devices configured to monitor one or more monitored systems (e.g., a heating, ventilation, and air-conditioning system). Examples of sensor devices whose readings are used to generate telemetry data can include bag filter sensor devices, on-coil temperature sensor devices, supply air temperature sensor devices, environment humidity sensor devices, fan angular motion sensor devices, and/or the like.

The condition monitoring system 105 may communicate with the client computing devices 102 and/or the telemetry server computing device 107 using a network 104. The network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Web Socket channel. In some embodiments, the protocol is JSON over RPC, JSON over REST/HTTP, and the like.

The condition monitoring system 105 may include a condition monitoring computing device 106 and a storage subsystem 108. The condition monitoring computing device 106 is configured to receive telemetry data and perform condition monitoring operations based on the received telemetry data.

In some embodiments, the condition monitoring computing device 106 can comprise training circuitry 111. In an embodiment, the training circuitry 111 can comprise one or more predefined functions and/or commands for processing telemetry data based on a predefined rule data object set, generating a training data set, training a machine learning anomaly detection model, and/or the like.

In some embodiments, the condition monitoring computing device 106 can comprise rule extraction circuitry 112. In an embodiment, the rule extraction circuitry 112 can comprise one or more predefined functions and/or commands for generating one or more extracted rule data objects and/or the like.

In some embodiments, the condition monitoring computing device 106 can comprise performance evaluation circuitry 113. In an embodiment, performance evaluation circuitry 113 can comprise one or more predefined functions and/or commands for processing a plurality of telemetry data in accordance with a predefined rule data object set, generating a rule-based result set, generating a performance evaluation score set, and/or the like.

In some embodiments, the condition monitoring computing device 106 can comprise a rules engine 114. The rules engine 114 can comprise one or more predefined functions and/or commands for executing one or more rule data objects, storing one or more predefined rule data object sets, updating one or more stored predefined rule data object sets, and/or the like.

The storage subsystem 108 is configured to store telemetry data as well as one or more machine learning anomaly detection models and data associated with the one or more machine learning anomaly detection models utilized by the condition monitoring computing device 106. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The condition monitoring system 105 may receive telemetry data from a telemetry server computing device 107. For example, a telemetry server computing device 107 may be a server device configured to transmit and/or receive readings of one or more sensor devices associated with one or more monitored system. An example of a telemetry server computing device 107 is a server device associated with a heating, ventilation, and air-conditioning system. The received telemetry data can be stored in the storage subsystem 108 of the condition monitoring system 105. Examples of sensor devices whose readings recorded and transmitted by the telemetry server computing device 107 include bag filter sensor devices, on-coil temperature sensor devices, supply air temperature sensor devices, environment humidity sensor devices, fan angular motion sensor devices, etc.

The condition monitoring computing device 106, telemetry server computing device 107, and/or the client computing device 102 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments disclosed herein.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 and/or circuitry otherwise accessible to the processor 202, such as training circuitry 111, rule extraction circuitry 112, performance evaluation circuitry 113, and/or rules engine 114. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example Operations

Disclosed herein is a method, apparatus, and computer program product which combines a rule-based approach with machine learning anomaly detection approach such that benefits of both approaches are experienced while disadvantages of conventional, disconnected uses of both approaches are mutually eliminated. In some embodiments, utilizing an isolation forest algorithm enables a condition monitoring system to detect failures, faults, and/or other problems which have not been detected previously, and thus enables continuous improvement of the condition monitoring system. In this regard, the condition monitoring system is improved locally as well as globally, as newly derived rules can be generalized, stored in a knowledge base, and utilized with other monitored systems. Additionally, this combined approach advantageously provides the ability to continuously measure performance of the condition monitoring system and efficiently detect drifts in performance.

FIG. 3 illustrates operations that are performed by the apparatus 200 (e.g., when embodied by condition monitoring computing device 106) in some example embodiments.

At operation 301, the condition monitoring computing device 106, such as the processor 202, the communications circuitry 208, and/or the like, is configured to receive a plurality of telemetry data from a monitored system. In some embodiments, the telemetry data comprises data captured by one or more sensor devices at or otherwise associated with the monitored system. As described above, the condition monitoring computing device 106 can receive a plurality of telemetry data from a telemetry server computing device 107 at a monitored system. The telemetry server computing device 107 may comprise a plurality of sensor devices.

In some embodiments, the plurality of telemetry data may be associated with a particular observation. An observation may be, for example, telemetry data collected from at least one sensor device for a particular time. As one example, the telemetry server computing device 107 associated with the monitored system may be configured to cause transmission of telemetry data associated with an internal temperature sensor (e.g., a sensor device configured to sense a temperature of a particular indoor space) and an external temperature sensor (e.g., a sensor device configured to sense a temperature of the environment external to the indoor space) at a predefined time interval (e.g., every fifteen minutes). In this regard, the plurality of telemetry data is an observation comprising telemetry data for the internal temperature sensor, telemetry data for the external temperature sensor, and a time value associated with when the telemetry data was generated.

At operation 302, condition monitoring computing device 106, such as the processor 202, the rules engine 114, and/or the like, is configured to process the plurality of telemetry data in accordance with at least one of a machine learning anomaly detection model and/or a rules engine comprising a predefined rule data object set. Processing the plurality of telemetry data in accordance with a machine learning anomaly detection model will be further described herein with respect to FIG. 5. Processing the plurality of telemetry data in accordance with a rules engine comprising a predefined rule data object set will be further described herein with respect to FIGS. 4 and 6. At operation 303, condition monitoring computing device 106, such as the processor 202, communications circuitry 208, and/or the like, is configured to generate an output comprising an indication of at least one fault of the monitored system based the processed plurality of telemetry data, further described herein with respect to FIGS. 5 and 6.

Training a Machine Learning Anomaly Detection Model

In some example embodiments, a newly operational monitored system within an environment, e.g., an HVAC system configured with a telemetry server computing device 107 comprising a plurality of sensor devices, may be installed at a particular location (e.g., a particular structure, building, or the like). The telemetry server computing device 107 is in communication with a condition monitoring system 105, for example, via network 104.

As described above, in some embodiments, the telemetry server computing device 107 can be stationed with and/or otherwise connected to a monitored system (e.g., an HVAC system) and comprises one or more sensor devices configured to collect various telemetry data associated with the monitored system during operation of the monitored system. For example, an example telemetry server computing device 107 can comprise sensor devices including, but not limited to, one or more bag filter sensor devices, on-coil temperature sensor devices, supply air temperature sensor devices, environment humidity sensor devices, fan angular motion sensor devices, and/or the like.

The condition monitoring computing device 106, in some embodiments, may be configured to store, via rules engine 114 and/or storage subsystem 108, at least one predefined rule data object set. In some embodiments, the at least one predefined rule data object set comprises a plurality of rule data objects. Each rule data object comprises computer program code defining a particular rule for the monitored system. In this regard, upon execution of a rule data object, e.g., via processor 202 and/or rules engine 114, and in some embodiments, the rule data object returns output data indicating that the particular rule data object was triggered. In other words, the rule data object returns data indicating that a particular condition is met during execution of the rule data object. In some embodiments, the data returned by a rule data object may comprise an indicator such as a value of one (1) in an instance in which the rule data object was triggered and a value of (0) in an instance in which the rule data object was not triggered. In some embodiments, the data returned by a rule data object may further comprise a timestamp value indicative of a time at which the rule data object was triggered.

In one example, an example rule data object can define a rule that a fan speed of a fan cooling unit associated with the monitored system (e.g., an HVAC system) is to be zero (e.g., the fan should not be running) in instances in which the occupancy of the room is zero. In this regard, the example rule data object can take, as parameters, telemetry data associated with a sensor of the HVAC system configured to detect fan speed of a fan cooling unit as well as telemetry data associated with a presence sensor of the HVAC system configured, for example, to detect presence of occupants within a space. In this regard, in an instance in which the rule data object analyzes telemetry data corresponding to readings indicating an unoccupied room and a fan speed greater than zero, the example rule data object is triggered and thus return data indicative of the conditions.

In this regard, in some embodiments, the condition monitoring system 105 can cause transmission of data returned by one or more rule data objects in the predefined rule data object set to a client computing device 102 and/or the like for review by a system administrator or the like. In this regard, a system administrator, or other personnel, is made aware that a rule has been triggered and may be caused to further investigate the issue which the returned data may be indicative of.

In some embodiments, for example, the example rule data object may not return any data in instance in which the telemetry data analyzed is determined to not trigger the rule. For example, the example rule data object may not return any data in instances in which telemetry data indicates that both the fan speed and occupancy level are zero. In this regard, a lack of data returned during monitoring of conditions under rules indicates that the monitored system is functioning normally, at least as defined by the predefined rule data object set. Alternatively, in some embodiments, data comprising an indication that the rule data object is satisfied (e.g., the monitored system is not experiencing a fault defined by the one or more rule data objects) can be returned (e.g., a value of zero (0) as described above).

In some embodiments, the rule data objects within the predefined rule data object set can be configured in advance, e.g., by system administrator(s) and/or other personnel, and can be based on faults, issues, and/or the like that are known to occur related to the monitored system. For example, previously observed and/or otherwise known faults in other monitored systems may be translated into one or more rule data objects and stored, e.g., at rules engine 114, such that the fault is observed in advance when the rule data object is triggered, thus allowing for preventative maintenance to occur to correct the particular issue, for example, before the issue potentially becomes worse.

Turning to FIG. 4 and continuing with the example described above, a newly operational monitored system and/or operational monitored system with minimal data or data below a predetermined threshold, during an initial period of operation (herein referred to as a cold-start period) causes transmission of a plurality telemetry data, e.g., via one or more sensor devices in communication with telemetry server computing device 107, to the condition monitoring system 105. In this regard, at operation 401, the condition monitoring computing device 106, such as the processor 202, the communications circuitry 208, and/or the like, is configured to receive a plurality of telemetry data from the monitored system.

In some embodiments, the plurality of telemetry data received by the condition monitoring system 105 can be optionally stored, e.g., in storage subsystem 108. In this regard, at operation 402, the condition monitoring computing device 106, such as the processor 202, memory 204, and/or the like, is configured to store the plurality of telemetry data.

In some embodiments, the plurality of telemetry data may be received (and stored) intermittently over the cold-start period. For example, as described above, the telemetry server computing device 107 is in communication with one or more sensor devices, and, in some embodiments, each sensor device may be configured to collect readings and generate telemetry data at different time intervals. In this regard, telemetry data associated with a particular sensor may be caused to be transmitted to the condition monitoring system upon the particular sensor collecting and generating the telemetry data.

During the cold-start period, the plurality of received telemetry data is continuously analyzed and processed in accordance with a predefined rule data object set stored at the condition monitoring system 105 (e.g., in rules engine 114). For example, in some embodiments, upon receiving telemetry data at the condition monitoring system 105, at operation 403, the condition monitoring computing device 106 such as the rules engine 114, is configured to process the received telemetry data in accordance with the predefined rule data object set to generate output data. In this regard, at least a portion of the plurality of telemetry data is passed to one or more rule data objects as parameters in order to determine whether the telemetry data satisfies or triggers the one or more rule data objects and generate output data. In some embodiments, the output data may comprise a plurality of labels (e.g., values of zero (0) or one (1) as described above) for the plurality of telemetry data that is indicative of whether the telemetry data satisfies one or more rule data objects of the predefined rule data object set. In this regard, the plurality of received telemetry data is continuously analyzed and processed in accordance with the predefined rule data object set during the cold-start period in order to provide protection of the monitored system against faults that can be detected by the rules but otherwise would have gone undetected by a machine learning anomaly detection model during a cold-start period.

In addition to storing received telemetry data, e.g., at storage subsystem 108, at operation 404, the condition monitoring computing device 106, such as the processor 202, communications circuitry 208, and/or the like, is further be configured to output an indication of the generated output data returned by the one or more rule data objects for evaluation. In some embodiments, the condition monitoring computing device 106 causes transmission of the generated output data to a client device 102. In this regard, a user at the client device 102, such as a system administrator or the like, can review the generated output data and be made aware that the system is experiencing one or more faults or other issues as defined by the rule data objects during an initial cold-start period in which the monitored system is collecting telemetry data to generate a training data set as further described below.

In some embodiments, the cold-start period may be a time period based on a predefined amount of time. In some embodiments, the cold-start period is a time period extending until a predefined amount of telemetry data is received and stored. In this regard, at decision block 405, the condition monitoring computing device 106, such as the processor 202, memory 204, and/or the like, is configured to determine whether the received amount of telemetry data satisfies a predefined threshold. In some embodiments, measurement of the amount of telemetry data received may comprise a measurement of storage, such as megabytes, gigabytes, and/or the like.

In some embodiments, in an instance in which the amount of received telemetry data generated fails to satisfy the predefined threshold, the condition monitoring computing device 106 continues to collect telemetry data (e.g., returning to operation 401) until the predefined threshold is satisfied while still monitoring the system for faults and/or other issues by processing the received telemetry data in accordance with the predefined rule data object set.

In either case, upon the end of the cold-start period, the training data set is utilized to train a machine learning anomaly detection model. In this regard, at operation 406, the condition monitoring computing device 106, such as the training circuitry 111, processor 202, and/or the like, is configured to generate a training data set based at least on the received plurality of telemetry data. In some embodiments, the training data set comprises the total amount of telemetry data received during the cold-start period.

At operation 407, condition monitoring computing device 106, such as the training circuitry 111, processor 202, and/or the like, is configured to train a machine learning anomaly detection model based on the training data set. As described above, the training data set can comprise the entire plurality of telemetry data received during the cold-start period.

For example, the training circuitry 111 comprises computer program code in the form of one or more isolation forest algorithms. In this regard, the training data set is provided to the one or more isolation forest algorithms in order to train the machine learning anomaly detection model. Thus, the machine learning anomaly detection model continuously receives telemetry data from sensors of the monitored system and the machine learning anomaly detection model is continuously trained using the received telemetry data in an unsupervised manner. In this regard, the machine learning anomaly detection model can detect anomalies indicative of new, previously unobserved faults of the monitored system. The machine learning anomaly detection model can also be evaluated based on the generated output data of rule data object executions to ensure that the anomaly detection machine learning model performs at least in agreement with the predefined rule data object set (e.g., the machine learning anomaly detection model, in addition to detecting new faults, also detects the same faults as the predefined rule data object set).

Example Operations for Generating and Extracting New Rules

FIG. 5A illustrates operations that are performed by the apparatus 200 (e.g., when embodied by condition monitoring computing device 106) for processing a plurality of telemetry data and generating one or more new rule data objects.

At operation 501, the condition monitoring computing device 106, such as the processor 202, the communications circuitry 208, and/or the like, is configured to receive a plurality of telemetry data from a monitored system. In some embodiments, the telemetry data comprises data captured by one or more sensor devices at or otherwise associated with the monitored system. As described above, the condition monitoring computing device 106 receives a plurality of telemetry data from a telemetry server computing device 107 at a monitored system. The telemetry server computing device 107 comprises a plurality of sensor devices. In some embodiments, the telemetry data received by the condition monitoring computing device 106 may optionally be stored, e.g., in storage subsystem 108.

At operation 502, the condition monitoring system 105, such as the processor 202, the training circuitry 111, and/or the like, is configured to process the plurality of telemetry data in accordance with a machine learning anomaly detection model to generate an anomaly score set for the plurality of telemetry data.

For example, in some embodiments, the condition monitoring system 105, via the training circuitry 111, is configured to process the plurality of telemetry data by providing the plurality of telemetry data as parameters to a machine learning anomaly detection model. In this regard, the machine learning anomaly detection model is configured to detect outliers and/or anomalies with regards to telemetry data and generate an anomaly score set for the plurality of telemetry data processed by the machine learning anomaly detection model as an output.

The anomaly score set comprises one or more anomaly scores. In some embodiments, an anomaly score is a value between zero (0) and one (1). For example, the closer the value of the anomaly score is to one (1), the higher the likelihood that the telemetry data associated with the anomaly score is indicative of an anomaly, or in other words, a potential fault in the monitored system. Likewise, the closer the value of the anomaly score is to zero (0), the higher the likelihood that the telemetry data associated with the anomaly score is not indicative of an anomaly (e.g., a potential fault) in the monitored system.

At operation 503, the condition monitoring system 105, such as the processor 202, the input/output circuitry 206, and/or the like, is configured to output an indication of the anomaly score set for evaluation. For example, the condition monitoring system 105 causes transmission of an indication of the anomaly score set to an administrative device associated with the monitored system, such as a client computing device 102 (e.g., via network 104) such that a user at the client computing device 102 can review the anomaly score set. For example, in some embodiments, a user (e.g., a system administrator) can review the anomaly score set to determine if the telemetry data associated with the anomaly score set is indicative of a fault of the monitored system and further, if the machine learning anomaly detection model is functioning appropriately.

At operation 504, the condition monitoring computing device 106, such as the processor 202, performance evaluation circuitry 113, and/or the like, is configured to process the plurality of telemetry data in accordance with the predefined rule data object set to generate a rule-based result set. In some embodiments, for example, after receiving the plurality of telemetry data (e.g., at operation 301), the plurality of telemetry data can be evaluated based on the predefined rule data object set. For example, in some embodiments, each rule data object in the predefined rule data object set is executed (e.g., via rules engine 114) in order to return output data based on the telemetry data. In this regard, the output data can be collected into a rule-based result set. In this regard, the rule-based result set comprises indications of how the telemetry data is evaluated based on the predefined rule data object set, e.g., which rule data objects in particular, if any, were triggered by the plurality of telemetry data. For example, as described above, a rule data object returns output data comprising a value of one (1) in an instance in which the rule data object is triggered using the plurality of telemetry data. Similarly, rule data object returns output data comprising a value of zero (0) in an instance in which the rule data object is not triggered using the plurality of telemetry data. In some embodiments, processing of the telemetry data in accordance with the predefined rule data object set can be done in parallel to processing the plurality of the telemetry data in accordance with the machine learning anomaly detection model (e.g., as described in operation 502).

At operation 505, the condition monitoring computing device 106, such as the processor 202, performance evaluation circuitry 113, and/or the like, is configured to determine, based on an analysis of the anomaly score set and the rule-based result set, whether the plurality of telemetry data is associated with an undetected fault of the monitored system. In some embodiments, a predefined limit value can be compared to the anomaly score set. For example, a predefined limit value may be stored (e.g., in store subsystem 108) and used in the determination of whether the machine learning anomaly detection model is to be retrained. As one example, a predefined limit value can comprise a value of 0.70. In this regard, in some embodiments, in an instance in which the anomaly score set comprises an anomaly score equal to or greater than 0.70, the condition monitoring computing device 106, such as the processor 202, performance evaluation circuitry 113, and/or the like, is configured to assign the anomaly score set a value of one (1). Similarly, in some embodiments, in an instance in which the anomaly score set comprises an anomaly score less than 0.70, the condition monitoring computing device 106, such as the processor 202, performance evaluation circuitry 113, and/or the like, is configured to assign the anomaly score set a value of zero (0).

In some embodiments, the determination of whether the plurality of telemetry data is associated with an undetected fault of the monitored system is based on a comparison of the anomaly score set and the rule-based results set. For example, in an instance in which the anomaly score set is assigned a value of one (1) and the rule-based results set comprises a value of zero (0) indicative that no rule data objects were triggered by the telemetry data, the group-based communication apparatus can determine that the plurality of telemetry data associated with the anomaly score set is indicative of and associated with an undetected fault of the monitored system.

At decision block 506, in an instance in which the plurality of telemetry data is determined to be associated with the anomaly score set is indicative of and associated with an undetected fault of the monitored system, the process continues to operation 507, wherein condition monitoring computing device 106, such as the processor 202, the rule extraction circuitry 112, and/or the like, is configured to generate at least one extracted rule data object. In some embodiments, the at least one extracted rule data object is based at least on the plurality of telemetry data. In this regard, the condition monitoring computing device 106 determines a new rule based on a fault associated with the telemetry data that was previously unobserved or defined by the predefined rule data object set.

As one example of new rule generation, the plurality of telemetry data processed in the operations described above can comprise telemetry data indicative of a Fan Coil Unit (FCU) cooling coil operating at a maximum level on, however also comprises telemetry data indicative of the fan of the FCU not functioning and/or operating at a lower speed than normal. In other words, the FCU is appropriately producing cold air but not providing it to the intended space (e.g., via the fan) and thus is exhibiting inefficient behavior. In this regard, the extracted rule data object comprises a new rule associated with this behavior to prevent this inefficient behavior from occurring in the future without a rule being triggered.

The rule extraction circuitry 112 comprises one or more predefined functions and/or commands for generating one or more extracted rule data objects. For example, the rule extraction circuitry 112 comprises one or more rule extraction algorithms configured to extract one or more rules. In this regard, in some embodiments, based on the telemetry data (e.g., observation) and associated anomaly score, one or more extracted rule data objects can be generated. In some embodiments, the one or more extracted rule data objects can be automatically stored in association with (e.g., in storage subsystem 108) and/or be automatically added to and/or otherwise associated with the predefined rule data object set (e.g., in rules engine 114).

Turning to FIG. 5B, in some embodiments, one or more domain experts, such as a system administrator or the like, can review the extracted rule data object prior to storage and/or association with the predefined rule data object set. For example, a domain expert may desire to review the extracted rule data object for accuracy prior to associating the extracted rule data object with the predefined rule data object set. In this regard, at operation 508, the condition monitoring system 105, such as the processor 202, communications circuitry 208, and/or the like, is configured to output an indication of the at least one extracted rule data object for evaluation.

In this regard, in some embodiments, an indication of the at least one extracted rule data object can be output to one or more client computing devices 102, such that the indication of the at least one extracted rule data object is presented via a graphical user interface (e.g., via input/output circuitry 206) or the like. In this manner, a domain expert may view the indication of the at least one extracted rule data object and, in some embodiments, modify the extracted rule data object to determine a new rule data object to be associated with the predefined rule data object set.

In some embodiments, at operation 509, the condition monitoring system 105, such as the processor 202, communications circuitry 208, and/or the like, is configured to receive at least one modified rule data object. For example, the at least one modified rule data object is received from client device 102 after a domain expert has reviewed and/or modified one or more extracted rule data objects.

Upon receiving the rule data object, the condition monitoring system is configured to update the predefined rule data object set to include the received one or more rule data objects. In this regard, at operation 510, the condition monitoring system 105, such as the processor 202, rules engine 114, and/or the like, is configured to store the rule data object in association with the predefined rule data object set.

Example Continuous Model Performance Evaluation

FIG. 6 illustrates operations that are be performed by the apparatus 200 (e.g., when embodied by condition monitoring system 105) for processing a plurality of telemetry data and evaluating the machine learning anomaly detection model based at least on a predefined rule data object set.

At operation 601, the condition monitoring computing device 106, such as the processor 202, performance evaluation circuitry 113, and/or the like, is configured to generate a performance evaluation score set for the machine learning anomaly detection model based on a comparison of the anomaly score set and the rule-based result set. In some embodiments, the performance evaluation score set comprises indications of both the anomaly score set (e.g., as determined in operation 302) and the rule-based result set. In some embodiments, the performance evaluation score set can comprise one or more performance evaluation scores comprising values indicative of how similar the anomaly score set is to the rule-based result set. For example, if the rule-based result set indicates that no rules were triggered by the plurality of telemetry data and the anomaly score set comprises an anomaly score assigned to zero (0), this indicates that the machine learning anomaly detection model is functioning normally with respect to the predefine rule data object set.

In this regard, at operation 602, the condition monitoring computing device 106, such as the processor 202, performance evaluation circuitry 113, and/or the like, is configured to determine, based on the performance evaluation score set, whether the machine learning anomaly detection model is to be retrained. For example, if the rule-based result set indicates that a rule data object was triggered by the plurality of telemetry data (e.g., a rule data object has returned a value of one (1)) and the anomaly score set comprises an anomaly score assigned to zero (0), this indicates that the machine learning anomaly detection model is functioning abnormally and may need to be retrained (e.g., with a new training data set).

At operation 603, the condition monitoring computing device 106, such as the processor 202, communications circuitry 208, and/or the like, is configured to output an indication of the performance evaluation score set for retraining evaluation. For example, the condition monitoring computing device 106 causes transmission, via communications circuitry or the like, of the performance evaluation score set to a client computing device 102, such that the indication of the performance evaluation score set is presented via a graphical user interface (e.g., via input/output circuitry 206) or the like. In this manner, a domain expert may view the indication of the performance evaluation score set and, in some embodiments, may perform further analysis and/or processing of the performance evaluation score set.

As described above, a method, apparatus, and computer program product are disclosed for combining a rule-based system with an anomaly detection system to provide an improved condition monitoring system. Utilizing a machine learning anomaly detection model, such as an isolation forest model, for condition monitoring processes of a system enables improved detection of failures, faults, and problems which were not seen before, and additionally, enables continuous improvement of the condition monitoring system. The condition monitoring system is improved locally as well as globally since newly derived rules can be generalized, stored in a knowledge base, and utilized for other monitored systems. Performance of the condition monitoring system is continuously measured and evaluated in order to detect performance drifts.

FIGS. 3-6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 304 of an apparatus employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including program code to cause the apparatus to:
   receive telemetry data from a monitored system, wherein the telemetry data comprise data captured by one or more sensor devices associated with the monitored system;
   process the telemetry data to generate:
     an anomaly score set for the telemetry data, by a machine learning anomaly detection model, wherein the anomaly score set comprises one or more anomaly scores indicative of a level of a fault associated with the monitored system; and
     a rule-based result set for the telemetry data in accordance with at least one predefined rule by a rule engine;
   determine, based on an analysis of the anomaly score set and the rule-based result set, if the telemetry data are associated with an undetected fault of the monitored system and if the machine learning anomaly detection model requires retraining; and
   in accordance with a determination that the telemetry data are associated with the undetected fault of the monitored system, the machine learning anomaly detection model is configured to:
     generate at least one extracted rule data object associated with the fault, wherein the at least one extracted rule data object comprises a new rule to fix the fault;
     cause transmission of data indicative of the fault of the monitored system and the at least one extracted rule data object to a device associated with the monitored system for display; and
     perform one or more actions to fix the fault associated with the monitored system based on the at least one extracted rule data object.

2. The apparatus according to claim 1, wherein the memory including the program code is further configured to, with the processor, cause the apparatus to:
   receive at least one modified rule data object, wherein the at least one modified rule data object is at least partially based on the at least one extracted rule data object; and
   store the modified rule data object in association with the at least one predefined rule in the rule engine.

3. The apparatus according to claim 1, wherein the memory including the program code is further configured to, with the processor, cause the apparatus to:
   generate a performance evaluation score set for the machine learning anomaly detection model based on a comparison of the anomaly score set and the rule-based result set;
   determine, based on the performance evaluation score set that the machine learning anomaly detection model requires retraining if the one or more anomaly scores of the anomaly score set is lesser than a value in rule-based result set; and
   output an indication on an interface in response to determining that the machine learning anomaly detection model requires retraining.

4. The apparatus according to claim 1, wherein the memory including the program code is further configured to, with the processor, cause the apparatus to:
   determine an assigned value for the anomaly score set based on a comparison of the one or more anomaly scores associated with the anomaly score set and a predefined limit value.

5. The apparatus according to claim 4, wherein the analysis of the anomaly score set and the rule-based result set comprises a comparison of the assigned value and the rule-based result set.

6. A computer-implemented method comprising:
   receiving telemetry data from a monitored system, wherein the telemetry data comprise data captured by one or more sensor devices associated with the monitored system;
   processing the telemetry data to generate:
     an anomaly score set for the telemetry data, by a machine learning anomaly detection model, wherein the anomaly score set comprises one or more anomaly scores indicative of a level of a fault associated with the monitored system; and
     a rule-based result set for the telemetry data in accordance with at least one predefined rule by a rule engine;
   determining, based on an analysis of the anomaly score set and the rule-based result set, if the telemetry data are associated with an undetected fault of the monitored system and if the machine learning anomaly detection model requires retraining; and
   in accordance with a determination that the telemetry data are associated with the undetected fault of the monitored system, the machine learning anomaly detection model is configured to:
     generate at least one extracted rule data object associated with the fault, wherein the at least one extracted rule data object comprises a new rule to fix the fault;

cause transmission of data indicative of the fault of the monitored system and the at least one extracted rule data object to a device associated with the monitored system for display; and perform one or more actions to fix the fault associated with the monitored system based on the at least one extracted rule data object.

7. The computer-implemented method according to claim 6, further comprising:

receiving at least one modified rule data object, wherein the at least one modified rule data object is at least partially based on the at least one extracted rule data object; and storing the modified rule data object in association with the at least one predefined rule in the rule engine.

8. The computer-implemented method according to claim 6, further comprising:

generating a performance evaluation score set for the machine learning anomaly detection model based on a comparison of the anomaly score set and the rule-based result set;

determining, based on the performance evaluation score set that the machine learning anomaly detection model requires retraining if the one or more anomaly scores of the anomaly score set is lesser than a value in rule-based result set; and outputting an indication on an interface in response to determining that the machine learning anomaly detection model requires retraining.

9. The computer-implemented method according to claim 6, further comprising:

determining an assigned value for the anomaly score set based on a comparison of the one or more anomaly scores associated with the anomaly score set and a predefined limit value.

10. The computer-implemented method according to claim 9, wherein the analysis of the anomaly score set and the rule-based result set comprises a comparison of the assigned value and the rule-based result set.

11. A computer program product comprising at least one non-transitory computer-readable storage medium having computer-readable program code portions stored therein, the computer-readable program code portions comprising an executable portion configured to:

receive telemetry data from a monitored system, wherein the telemetry data comprise data captured by one or more sensor devices associated with the monitored system;

process the telemetry data to generate:

an anomaly score set for the telemetry data, by a machine learning anomaly detection model, wherein the anomaly score set comprises one or more anomaly scores indicative of a level of a fault associated with the monitored system; and a rule-based result set for the telemetry data in accordance with at least one predefined rule by a rule engine;

determine, based on an analysis of the anomaly score set and the rule-based result set, whether if the telemetry data are associated with an undetected fault of the monitored system and if the machine learning anomaly detection model requires retraining; and in accordance with a determination that the telemetry data are associated with the undetected fault of the monitored system, the machine learning anomaly detection model is configured to:

generate at least one extracted rule data object associated with the fault, wherein the at least one extracted rule data object comprises a new rule to fix the fault;

cause transmission of data indicative of the fault of the monitored system and the at least one extracted rule data object to a device associated with the monitored system for display; and perform one or more actions to fix the fault associated with the monitored system based on the at least one extracted rule data object.

12. The computer program product according to claim 11, wherein the computer-readable program code portions comprising the executable portion are further configured to:

receive at least one modified rule data object, wherein the at least one modified rule data object is at least partially based on the at least one extracted rule data object; and store the modified rule data object in association with the at least one predefined rule in the rule engine.

13. The computer program product according to claim 11, wherein the computer-readable program code portions comprising the executable portion are further configured to:

generate a performance evaluation score set for the machine learning anomaly detection model based on a comparison of the anomaly score set and the rule-based result set;

determine, based on the performance evaluation score set the machine learning anomaly detection model requires retraining if the one or more anomaly scores of the anomaly score set is lesser than a value in rule-based result set; and output an indication on an interface in response to determining that the machine learning anomaly detection model requires retraining.

14. The computer program product according to claim 11, wherein the computer-readable program code portions comprising the executable portion are further configured to:

determine an assigned value for the anomaly score set based on a comparison of the one or more anomaly scores associated with the anomaly score set and a predefined limit value, wherein the analysis of the anomaly score set and the rule-based result set comprises a comparison of the assigned value and the rule-based result set.

15. The apparatus according to claim 1, wherein the at least one extracted rule data object is generated based at least in part on the one or more anomaly scores of the anomaly score set.

16. The computer-implemented method according to claim 6, wherein generating at least one extracted rule data object associated with the fault is based at least in part on the one or more anomaly scores of the anomaly score set.

17. The computer program product according to claim 11, wherein the at least one extracted rule data object is generated based at least in part on the one or more anomaly scores of the anomaly score set.

18. The apparatus according to claim 1, wherein the determination that the telemetry data are associated with the undetected fault of the monitored system is based on a comparison that the one or more anomaly scores of the anomaly score set exceeds a value in rule-based result set.

19. The computer-implemented method according to claim 6, wherein determining if the telemetry data are associated with the undetected fault of the monitored system comprises:

comparing the one or more anomaly scores of the anomaly score set with a value in rule-based result set; and determining if comparison of the one or more anomaly scores of the anomaly score set exceeds a value in rule-based result set.

20. The computer program product according to claim 11, wherein the determination that the telemetry data are associated with the undetected fault of the monitored system is based on a comparison that the one or more anomaly scores of the anomaly score set exceeds a value in rule-based result set.

* * * * *